United States Patent [19]
Bellare et al.

[11] Patent Number: 5,491,750
[45] Date of Patent: Feb. 13, 1996

[54] METHOD AND APPARATUS FOR THREE-PARTY ENTITY AUTHENTICATION AND KEY DISTRIBUTION USING MESSAGE AUTHENTICATION CODES

[75] Inventors: Mihir M. Bellare, New York, N.Y.; Phillip W. Rogaway, Austin, Tex.

[73] Assignee: International Business Machines Corporation, Armonk, N.Y.

[21] Appl. No.: 175,882
[22] Filed: Dec. 30, 1993
[51] Int. Cl.⁶ .................................................. H04L 9/08
[52] U.S. Cl. ............................................ 380/21; 380/25
[58] Field of Search .............................. 380/21, 23–25; 340/825.31

[56] References Cited

U.S. PATENT DOCUMENTS

| | | | |
|---|---|---|---|
| 4,193,131 | 3/1980 | Lennon et al. | 380/21 |
| 4,438,824 | 3/1984 | Mueller-Schloer | 380/21 |
| 4,549,075 | 10/1985 | Saada et al. | 380/25 |
| 4,588,985 | 5/1986 | Carter et al. | 340/825.31 |
| 4,720,859 | 1/1988 | Aaro et al. | 380/25 |
| 4,723,284 | 2/1988 | Munck et al. | 380/25 |
| 4,799,061 | 1/1989 | Abraham et al. | 380/23 |
| 5,148,479 | 9/1992 | Bird et al. | 380/25 |
| 5,153,919 | 10/1992 | Reeds, III et al. | 380/21 |
| 5,241,599 | 8/1993 | Bellovin et al. | 380/21 |
| 5,299,263 | 3/1994 | Beller et al. | 380/21 |
| 5,371,794 | 12/1994 | Diffie et al. | 380/21 |

OTHER PUBLICATIONS

R. R. Jueneman, S. M. Matyas, C. H. Meyer, "Message Authentication", Sep. 1985, vol. 23, No. 9. pp. 29–40.
R. Bird, et al., "Systematic Design of a Family of Attack–Resistant Authentication Protocols", Jun. 1993, pp. 1–28.
Steven M. Bellovin, Michael Merritt, "Encrypted Key Exchange: Password–Based Protocols Secure Against Dictionary Attacks", pp. 1–13.
T. Mark A. Lomas, et al. "Reducing Risks from Poorly Chosen Keys", pp. 14–18.
Li Gong, et al. "Protecting Poorly Chosen Secrets from Guessing Attacks", Sep. 25, 1992, pp. 1–18.
Refik Molva, et al., "Research Report, KryptoKnight Authentication and Key Distribution System", Apr. 1, 1992, pp. 1–17.

*Primary Examiner*—Salvatore Cangialosi
*Attorney, Agent, or Firm*—Jeffrey S. LaBaw; Melvin A. Hunn; Andrew J. Dillon

[57] ABSTRACT

A method is provided for authenticating communication partners utilizing communication flows which are passed over an insecure communication channel. The method includes a number of method steps. A trusted intermediary is provided which is capable of communication with the communication partners over the insecure communication channel. A plurality of long-lived secret keys are provided, one for each communication partner. The plurality of long-lived secret keys are distributed to a particular one of the communication partners, and to the trusted intermediary. Therefore, the long-lived secret key is known only by the particular communication partner to which it is assigned, and the trusted intermediary. A request for communication between communication partners is provided to the trusted intermediary. The trusted intermediary is utilized to generate a short-lived secret key for utilization in a communication session between the communication partners. The short-lived secret key for each particular partner is masked in a manner which is dependent upon that particular partner's long-lived secret key. The masked short-lived secret keys are distributed in a plurality of communication flows to the communication partners. Finally, the trusted intermediary and communication partners exchange authentication proofs with one another in a plurality of communication flows. Preferably, the communication flows between the trusted intermediary and the communication partners accomplish substantially concurrently the tasks of authenticating the identity of the trusted intermediary and the communication partners, as well as distribute a short-lived secret key to the communication partners which can be utilized by them in a particular communication session.

15 Claims, 13 Drawing Sheets

| ABSTRACT | CONCRETE |
|---|---|
| Challenge$_{AS}$ | $N_A$ |
| $\pi_{SB}$ | $T_S$, $MAC_b(S, A, T_S, \{\alpha\}_b)$ |
| $\pi_{SA}$ | $MAC_a(S, B, N_A, \{\alpha\}_a, \{\alpha\}_b, Text2, \pi_{SB})$ |
| Challenge$_{AB}$ | $N_A^1$ |
| $\pi_{AB}$ | $T_A$, $MAC_\alpha(A, T_A, N_A^1, Text3)$ |
| $\pi_{BA}$ | $MAC_\alpha(B, N_A^1, Text4)$ |

FIG. 2

| ABSTRACT | CONCRETE |
|---|---|
| Challenge$_{AS}$ | $R_A$ |
| Challenge$_{AB}$ | $R_A$ |
| Challenge$_{BS}$ | $R_B$ |
| $\pi_{SA}$ | $MAC_a(S, B, R_A, \{\alpha\}_a)$ |
| $\pi_{SB}$ | $MAC_b(S, A, R_A, R_B, Text2, \{\alpha\}_a, \{\alpha\}_b, Text3, \pi_{SA})$ |
| Challenge$_{BA}$ | $R_B^1$ |
| $\pi_{BA}$ | $MAC_\alpha(B, R_B^1, Text1, Text4)$ |
| $\pi_{AB}$ | $MAC_\alpha(A, R_B^1, Text5)$ |

FIG. 5

| ABSTRACT | CONCRETE |
|---|---|
| Challenge$_{AB}$ | $R_A$ |
| $\pi_{BA}$ | $MAC_b(B,R_A,R_B,Text1)$ |
| Challenge$_{BS}$ | $R_B$ |
| Challenge$_{BA}$ | $R_B$ |
| Challenge$_{AS}$ | $R_A$ |
| $\pi_{SB}$ | $MAC_b(S,A,R_B,\{\alpha\}_b)$ |
| $\pi_{SA}$ | $MAC_a(S,B,R_A,R_B,Text1,Text3,\{\alpha\}_a,\{\alpha\}_b,Text4,\pi_{SB})$ |
| $\pi_{AB}$ | $MAC_\alpha(A,R_B,Text2,Text5)$ |

FIG. 8

| ABSTRACT | CONCRETE |
|---|---|
| Challenge$_{AS}$ | $R_A$ |
| $\pi_{SB}$ | $MAC_b(S, A, \{\alpha\}_b)$ |
| $\pi_{SA}$ | $MAC_a(S, B, R_A, Text1, \{\alpha\}_a, \{\alpha\}_b, \pi_{SB}, Text2)$ |
| Challenge$_{AB}$ | $R_A^1$ |
| Challenge$_{BA}$ | $R_B$ |
| $\pi_{BA}$ | $MAC_\alpha(B, R_A^1, R_B, Text3, Text4)$ |
| $\pi_{AB}$ | $MAC_\alpha(A, R_B, Text5)$ |

FIG. 11

METHOD AND APPARATUS FOR THREE-PARTY ENTITY AUTHENTICATION AND KEY DISTRIBUTION USING MESSAGE AUTHENTICATION CODES

BACKGROUND OF THE INVENTION

1. Technical Field

The present invention relates in general to techniques for ensuring the security of data transmitted over insecure communication channels, and in particular relates to techniques for ensuring entity authentication in a multi-party communication scenario.

2. Description of the Related Art

With the increased utilization of distributed data processing systems to share and communicate sensitive and confidential information, the computing and relating industries are paying significantly increased attention to improving and refining known techniques for securing data which is communicated over insecure communication channels such as telephone lines and electromagnetic-based communication systems such as cellular networks.

Three long standing industry goals exist. First, it is important that the particular communication partners in a distributed data processing system be able to authenticate the identity of other communication partners within the distributed data processing system. Commonly:, this entity authentication requirement is met by depositing a long-lived and shared secret key at two or more communication nodes in the data processing system or telecommunications network. For example, in a computing environment, a user may possess a secret password which is also known by a host computer within the data processing system. When authentication is desired, a protocol is executed which, based on this shared secret, serves to authenticate one party to the other, or each party to the other. For example, the long-lived and shared secret key can be utilized in a conventional encryption operation such as a DES encryption. Most commonly, the communication partner desiring authentication of another partner directs a "challenge" to the other partner which is in the form of a random bit stream. The partner for which authentication is sought typically performs an encryption operation upon the challenge bit stream utilizing the long-lived and shared secret key, and then passes this data back to the challenging party. This data is decrypted to determine whether the responding party has possession or knowledge of the long-lived and shared secret key, or the challenger utilizes an encryption engine to generate the response he or she is seeking, and then compares the response to the correct answer. This operation may be performed unilaterally or bilaterally. In a unilateral operation, one party obtains authentication of the identity of another party within the distributed data processing system. In a bilateral entity authentication procedure, both parties typically issue a "challenge" to the other party, which must be responded to properly before communication can be allowed between the communication nodes.

The second broad goal of the industry is to provide techniques for generating and distributing short-lived and secret session keys which are shared by two or more communication partners after authentication of the various communication partners has been obtained. In accordance with the present invention, the distribution of the short-lived and secret session key is tightly coupled with the entity authentication operations. The utilization of a session key ensures that the long-lived and shared secret key need not be used more often than is absolutely necessary, and it is further useful to guard against "replay attacks" across the communication sessions which communicating partners may engage in. Typically, the long-lived and shared secret key is utilized only during entity authentication operations. Immediately after authentication of the communicating parties is obtained, the short-lived and secret session key is distributed and utilized to allow communication back and forth between the parties in that particular session, to be authenticated, encrypted, or both.

The third broad industry goal is that of assuring a communicating party which has received data over an insecure communication channel that the data has not been modified in transit. Often, such message authentication is achieved by having the originating party compute a short "authentication tag" as a function of the message being transmitted and the secret key shared by the communicating partners. This authentication tag is typically appended to the data stream which is being communicated between the parties. Upon receipt of the data stream and authentication tag, the receiving party analyzes the authentication tag by performing the same operations which were performed upon the data set by the sending party to generate its own authentication tag. If the sender's authentication tag matches identically the receiver's authenticated tag, then the recipient of the data can be assured that the data has not been altered in any way. This type of protection prevents an active adversary from entering the insecure communication channel and meddling with the data.

In devising security systems for allowing secure communication between communication partners, it is generally assumed that an adversary may be (1) passive and perform eavesdropping operations to monitor and record all communications between the parties in the distributed data processing system, or (2) active and actually participate in communications within the distributed data processing system by requesting access to data or resources and issuing or responding to authentication challenges. The capabilities of an active adversary are taken to include all those of a passive one.

SUMMARY OF THE INVENTION

It is one objective of the present invention to provide a security system which allows for secure communication between multiple communication partners, which is facilitated by the actions of a trusted authentication intermediary.

It is another objective of the present invention to provide a security system for allowing communication partners to communicate over an insecure communication channel in a plurality of communication flows, in a manner which substantially concurrently operates to authenticate each communication partner to the other communication partners, and to distribute a short-lived session key which may be utilized by the communication partners to communicate securely over the insecure communication channel, without subjecting the session to risk of attack by either a passive or active adversary.

It is another objective of the present invention to provide a security system for utilization in communicating data over an insecure communication channel, wherein a trusted authentication intermediary is utilized to facilitate authentication of the communication partners, and to distribute a short-lived session key which may be utilized by the communication partners after authentication is demonstrated, wherein entity authentication of the multiple communication partners is accomplished through utilization of one or more message authentication codes.

These and other objectives are achieved as is now described. A method is provided for authenticating communication partners utilizing communication flows which are passed over an insecure communication channel. The method includes a number of method steps. A trusted intermediary is provided which is capable of communication with the communication partners over the insecure communication channel. A plurality of long-lived secret keys are provided, one for each communication partner. The plurality of long-lived secret keys are distributed to a particular one of the communication partners, and to the trusted intermediary. Therefore, the long-lived secret key is known only by the particular communication partner to which it is assigned, and the trusted intermediary. A request for communication between communication partners is provided to the trusted intermediary. The trusted intermediary is utilized to generate a short-lived secret key for utilization in a communication session between the communication partners. The short-lived secret key for each particular partner is masked in a manner which is dependent upon that particular partner's long-lived secret key. The masked short-lived secret keys are distributed in a plurality of communication flows to the communication partners. Finally, the trusted intermediary and communication partners exchange authentication proofs with one another in a plurality of communication flows. Preferably, the communication flows between the trusted intermediary and the communication partners accomplish substantially concurrently the goals of authenticating the identity of the trusted intermediary and the communication partners, and of distributing a short-lived secret session key to the communication partners which can be utilized by them in a particular communication session.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objectives and advantages thereof, will best be understood by reference to the following detailed description of an illustrative embodiment when read in conjunction with the accompanying drawings, wherein:

FIGS. 1, 2, and 3 provide a view of one embodiment of the present invention wherein the goals of entity authentication and session key distribution are accomplished in four communication flows between a trusted intermediary S and two communication partners a, b;

FIGS. 4, 5 and 6 depict a second embodiment of the present invention, wherein entity authentication and session key distribution are accomplished in five communication flows between the trusted intermediary S and communication partners a, b in an ABSBAB-format;

FIGS. 7, 8, and 9 depict a third embodiment of the present invention, wherein the goals of entity authentication and session key distribution are accomplished in five communication flows between a trusted intermediary S and communication partners a, b in an ABASAB-format;

FIGS. 10, 11, and 12 provide a view of a fourth embodiment of the present invention, wherein the goals of entity authentication and session key distribution are accomplished in five communication flows between a trusted intermediary S and communication partners a, b in an ASABAB-format.

DETAILED DESCRIPTION OF PREFERRED EMBODIMENT

Figure 1:
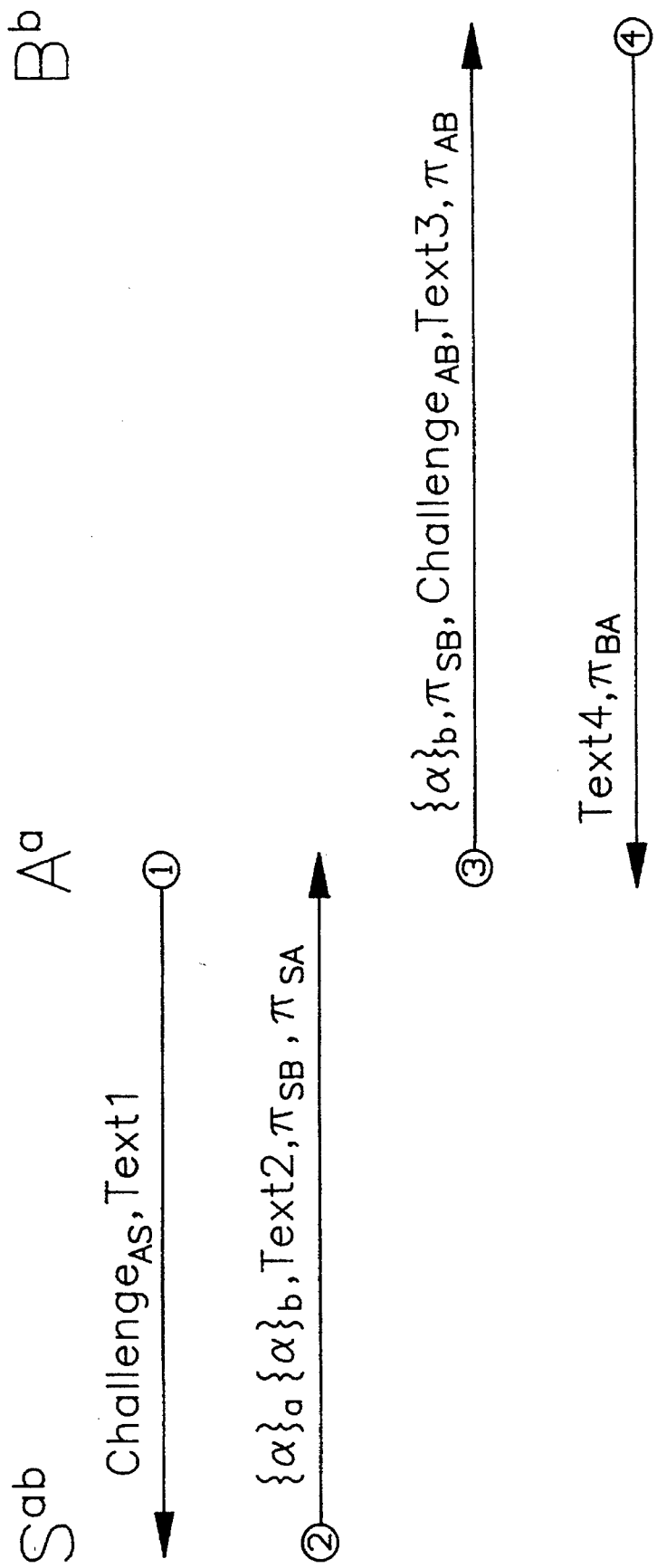

The present invention is directed to the problem of three party authentication in an insecure distributed environment. There is provided a trusted authentication server which is denoted in this text and accompanying figures by "S". Party A shares with S a key a not known by anyone else. Similarly, party B shares with S a key b not known to anyone else. A and B wish to identify each other and come into possession of a shared, short-lived session key, in the face of adversaries trying to impersonate them.

One common and current misconception in cryptography is that entity authentication can be achieved based upon encryption alone. This misconception is embodied in the work of the International Standards Organization set forth in draft ISO/IEC 9798-2, entitled "Information Technology—Security Techniques—Entity Authentication—Part 2: Entity Authentication Using Symmetric Techniques", Draft No. 12, dated September of 1992. In fact, encryption does not have properties which are suitable for this purpose, and the resulting protocols are at worst incorrect and at best too complex to analyze. The present invention provides entity authentication protocols which cover the necessary authentication functions identified in the ISO Draft Standard for all three party authentication tasks. Instead of being based upon the utilization of encryption, the present invention utilizes message authentication techniques to authenticate an entity in an insecure communication channel.

In accordance with the present invention, two communication partners interact with each other and a trusted intermediary in order to authenticate one another and simultaneously come into possession of a shared short-lived, session key. Entity authentication and shared session key exchange can be accomplished by a sequence of communication flows in which messages are tagged utilizing a message authentication code keyed by a shared key and taken over the message being transmitted and the identity of the sender. Alternatively, the entity authentication and key exchange can be accomplished by a sequence of flows in which messages are tagged utilizing a message authentication code keyed by a shared key and taken over the message being transmitted and some other (possibly empty) string, which, in the context of the protocol, uniquely determines the identity of the sender. Viewed most broadly, in the present invention, the communication parties exchange "authentication proofs" with ,one another utilizing the trusted intermediary in a manner which ensures entity authentication, which is the primary goal, and which results in a distribution of a short-lived and secret, shared session key, which is the secondary goal.

This application discusses four specific three-party authentication protocols in detail, but a far larger number of variations are possible which will fall within the scope of the claims of this patent. The four specific embodiments discussed are:

(1) a four-pass, three-party authentication;

(2) a five-pass, three-party authentication, with an ABSBAB-format;

(3) a five-pass, three-party authentication, with an ABASAB-format; and (4) a five-pass, three-party authentication, with an ASABAB-format.

Figure 3:
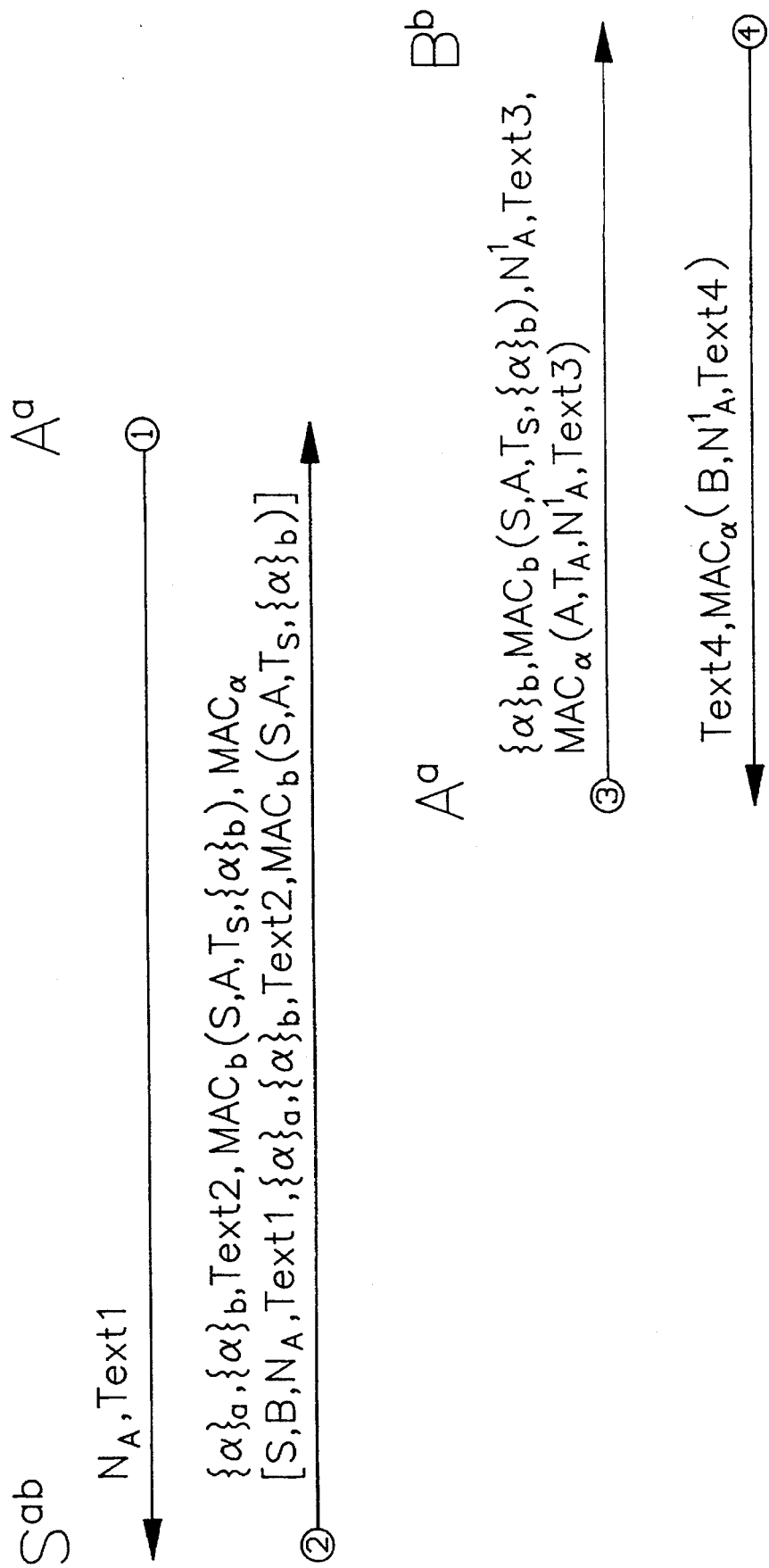
Figure 4:
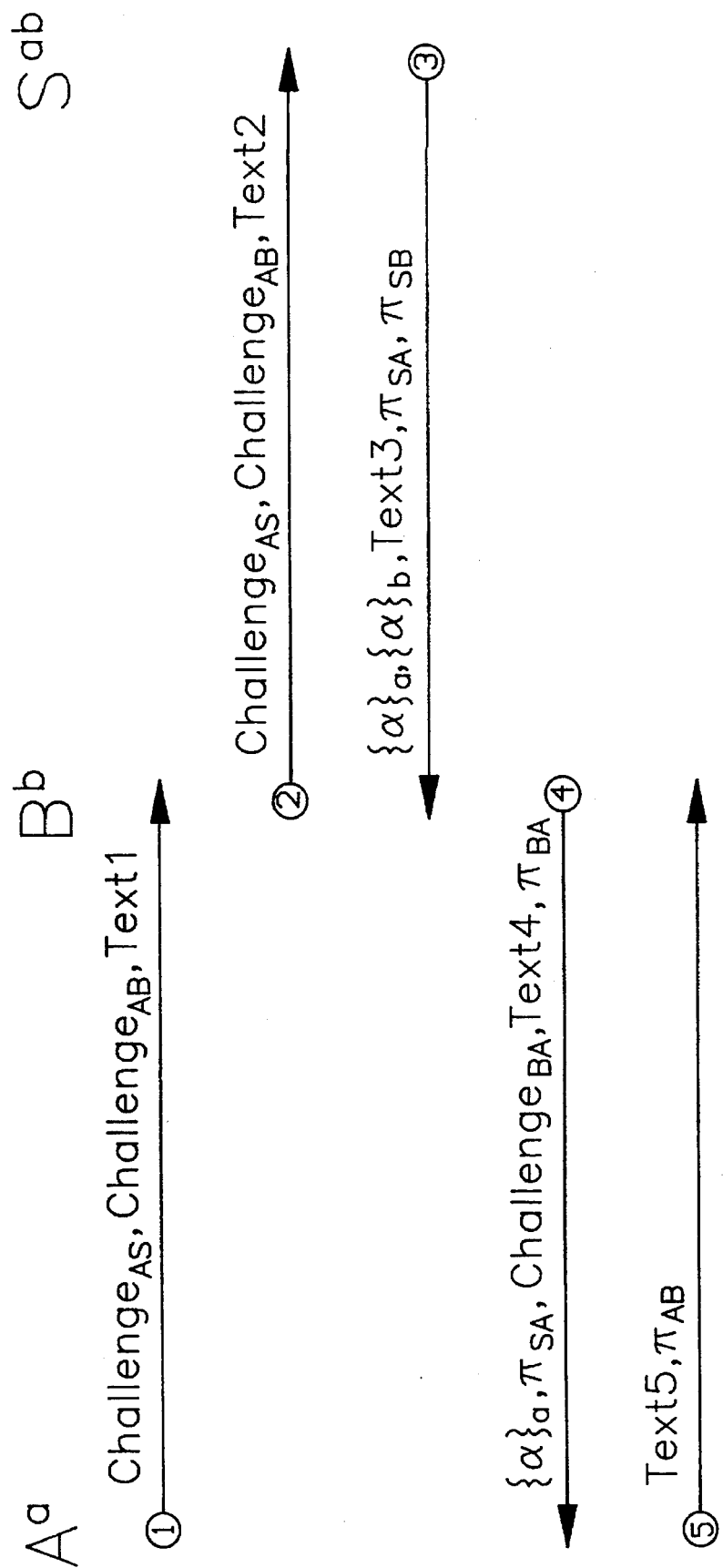
Figure 6:
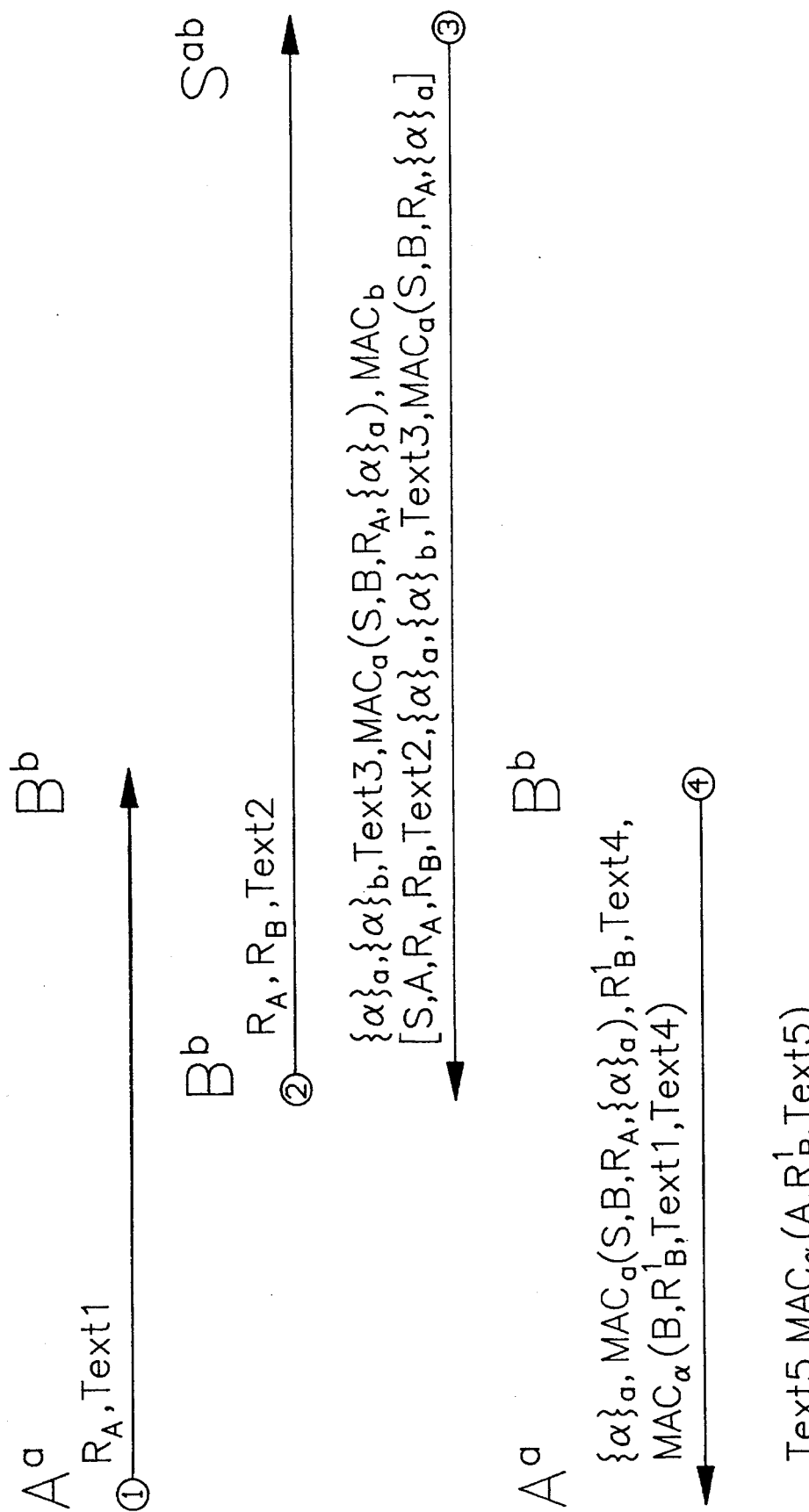
Figure 7:
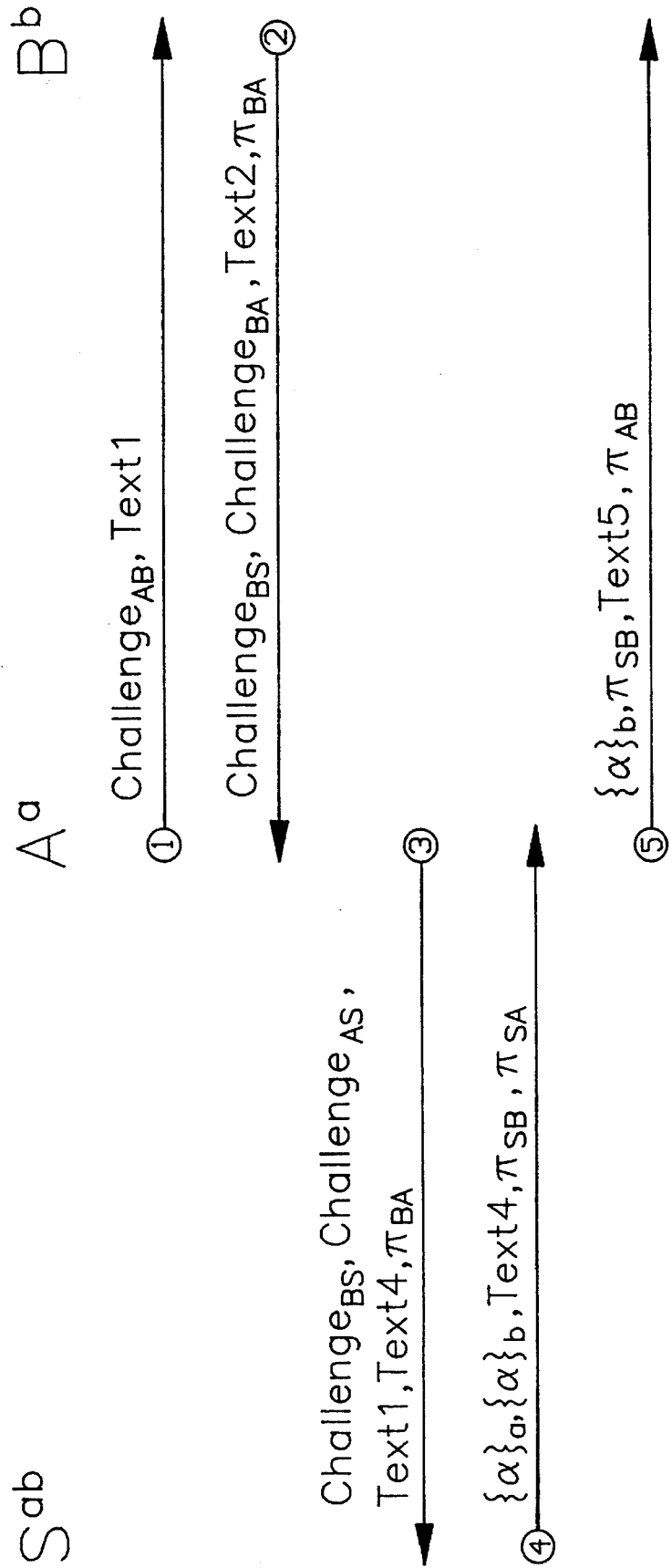
Figure 9:
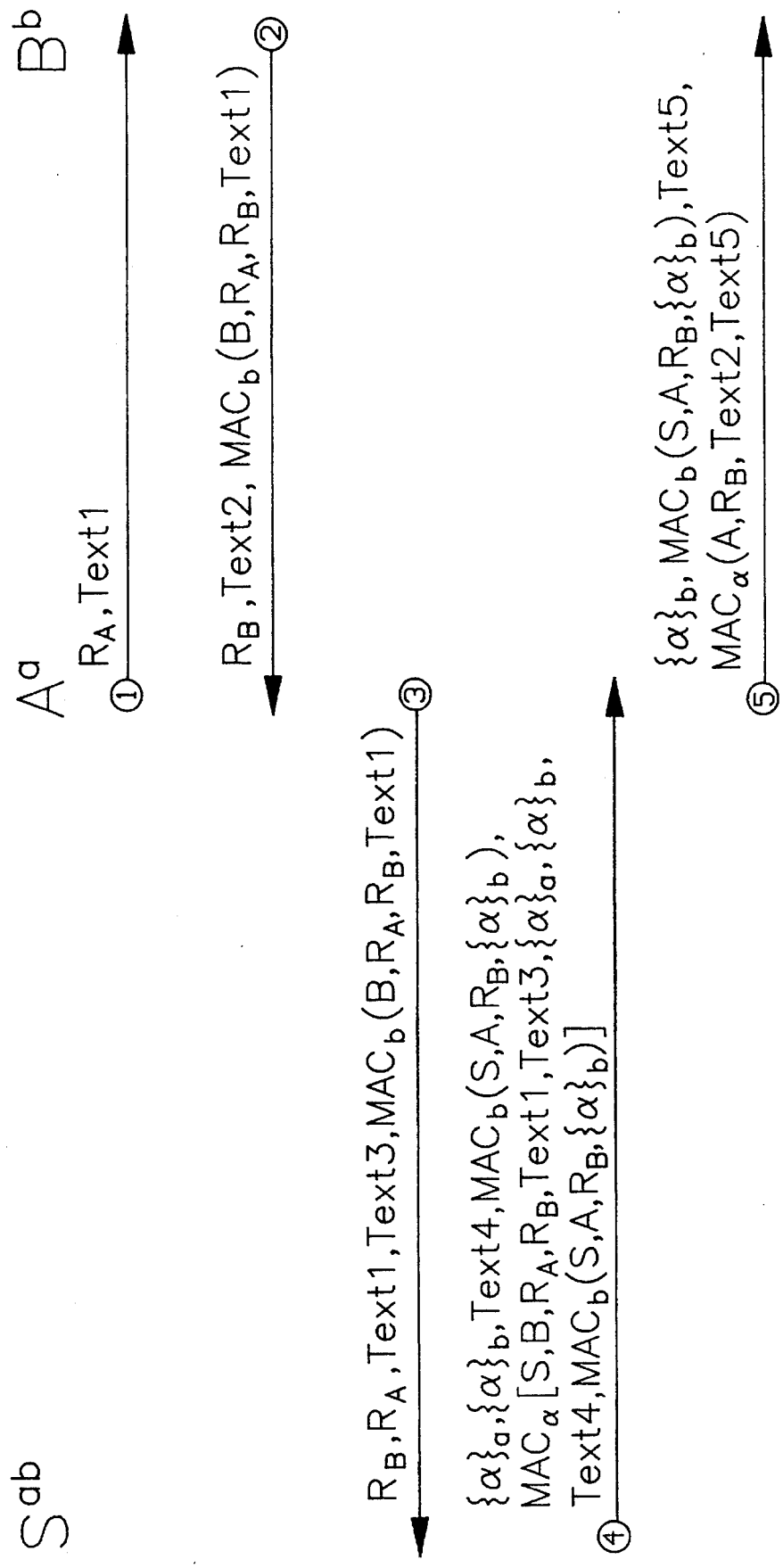
Figure 10:
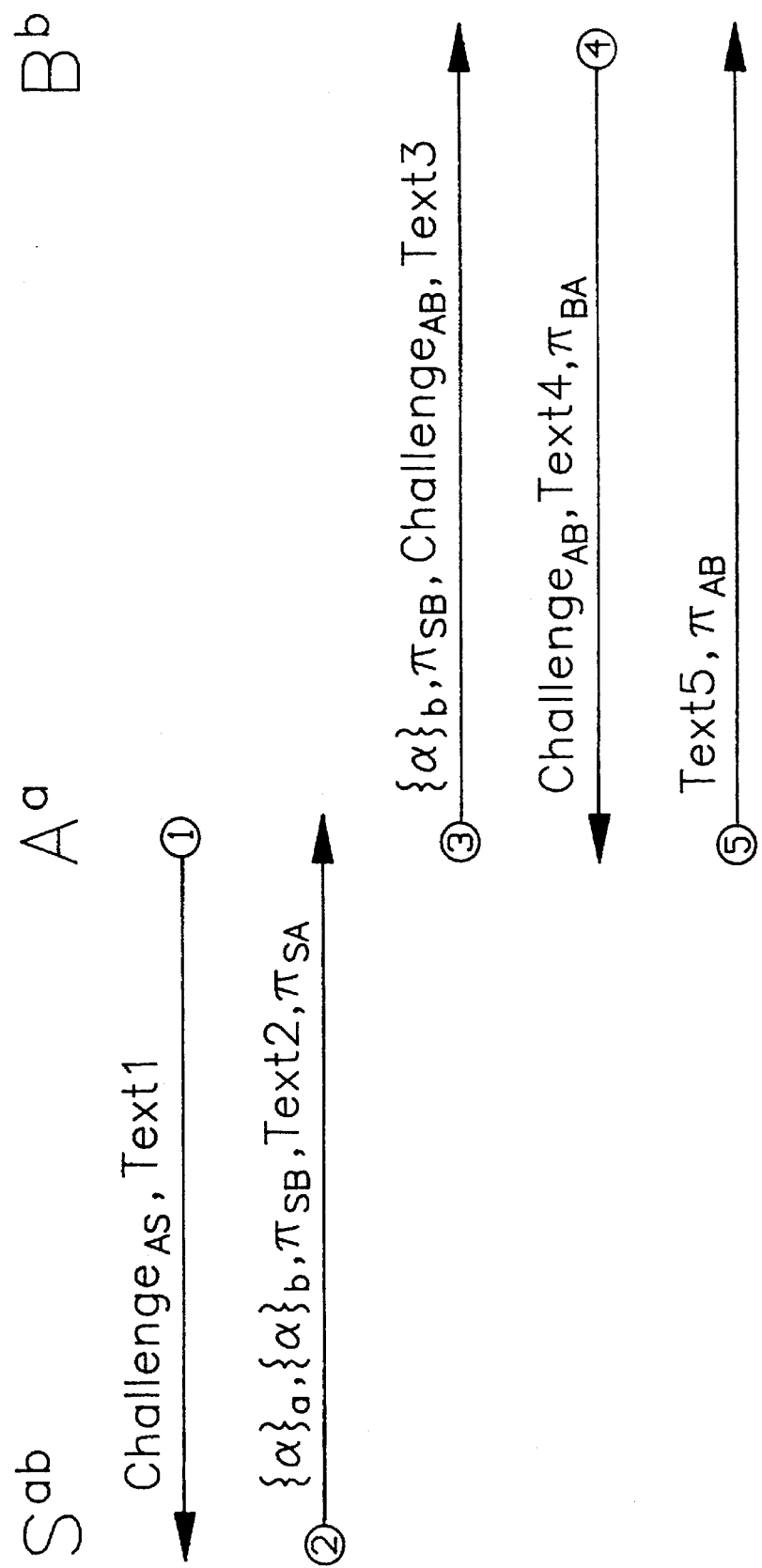
Figure 12:
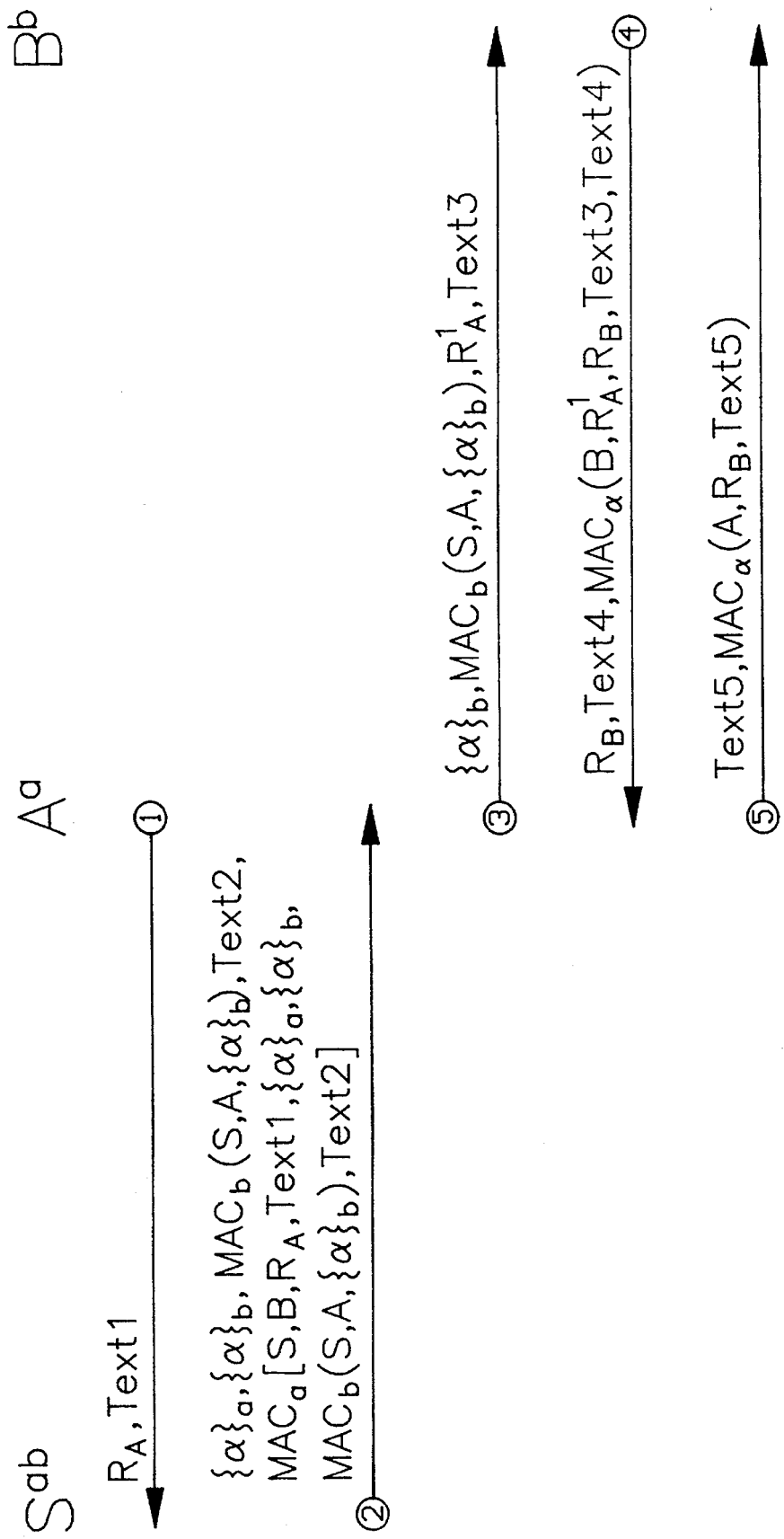

In the detailed description which follows, FIGS. 1, 2, and 3 are utilized to depict and describe the four-pass protocol. FIGS. 4, 5, and 6 are utilized to describe the five-pass, three-party authentication protocol with an ABSBAB-format. FIGS. 7, 8, and 9 are utilized to describe and depict the five-pass, three-party authentication protocol, with an ABASAB-format. Finally, FIGS. 10, 11, and 12 are utilized to depict and describe the five-pass, three-party authentication protocol with an ASABAB-format.

Before the four embodiments are discussed in detail, the symbols and nomenclature will be defined. For each embodiment, the trusted intermediary is identified as "intermediary S", and the two communication partners are identified as "communication partner A" and "communication partner B". The four embodiments discussed herein describe a communication scenario wherein two long-lived shared and secret keys are utilized. These keys are identified as "long-lived shared key a" and "long-lived shared key b". The possession or knowledge of a long-lived, shared, secret key by trusted intermediary S, communication partner A, or communication partner B is identified by providing the symbol for the long-lived and shared secret key as a superscript to the letter which identifies the particular communication entity. For example, in FIG. 1, the three communication entities are identified at the top of the figure as "S", "A", and "B". The possession of the long-lived and shared secret keys a, b is identified by providing a superscript to the identifiers S, A, B in that figure. For example, the trusted intermediary S has possession of the long-lived and shared secret keys a, b. This is denoted as "$S^{ab}$". Communication partner A has possession of the long-lived and shared secret key a, which is denoted as "$A^a$". Likewise, communication partner B has possession of the long-lived and shared secret key b, which is identified as "$B^b$". As is conventional, the long-lived and shared secret keys a, b are divided into two halves. One-half is retained by trusted intermediary S, and the other half is retained by a particular communication partner. Thus, the long-lived and shared secret key can be identified as: $a=(a_1, a_2)$, and $b=(b_1, b_2)$.

In the views of FIGS. 1, 3, 4, 6, 7, 9, 10, and 12, the communication flows between the trusted intermediary S and communication partners a, b are identified by an arrow originating from the source of the communication flow, and terminating at the destination of the communication flow. The communication flows are arranged in chronological order, with the earlier communication flows disposed at the top of each figure, and the later communication flows disposed at the bottom of each figure. To facilitate an understanding of the order of these communication flows, each communication flow is numbered with an arabic numeral between 1 and 5. In the embodiment FIGS. 1 through 3, only four communication flows exist, so they are numbered and identified by arabic numerals 1, 2, 3, and 4. In the other embodiments, five communication flows exist, so they are numbered and identified with arabic numerals 1, 2, 3, 4, and 5.

In each communication flow it is possible or desirable to provide additional information with that which is required to perform the functions of entity authentication and short-lived session key distribution operations. Since it is common to send such additional textual information, the communication flows of the figures include multiple textual packages identified as "Text1, Text2, Text3, Text4, and Text5". In accordance with the present invention, preferably message authentication code operations are applied to selected portions of selected communication flows to perform the primary task of authenticating the trusted intermediary and the communication partners, and the incidental task of applying message authentication codes to the unnecessary textual portions (Text1, Text2, Text3, Text4, and Text5), which ensures that the content of the message has not been changed or altered in any way. Thus, in the present invention, the communication flows perform all three major secrecy functions: entities are authenticated, short-lived session keys are distributed, and plaintext which is transmitted with each flow is subjected to a message authentication operation.

In accordance with the present invention, the trusted intermediary S performs an important function of generating a particular short-lived session key $\alpha$ which may be utilized by the communication partners A, B to communicate for a particular (finite) interval, provided that all the communication partners (including the trusted intermediary S) are authenticated. Since the short-lived session key $\alpha$ should never be sent through the insecure communication channel in plaintext, the trusted intermediary S serves an important secondary function of masking, preferably by encrypting, the short-lived session key $\alpha$. In the communication flows of the figures, the encryption operations are performed utilizing a particular key, which is preferably the long-lived and shared secret key which is known only by the trusted intermediary S and a particular communication partner. For communication partner A, the long-lived secret key a is known only by communication partner A and trusted intermediary S. Therefore, the long-lived secret key a is utilized to mask or encrypt the short-lived session key $\alpha$; this operation is identified as "$\{\alpha\}_a$". Likewise, communication partner B has possession of the long-lived secret key b along with trusted intermediary S. Trusted intermediary S passes the short-lived session key $\alpha$ to communication partner B after a masking or encryption operation is performed upon the short-lived session key b. This is identified in the figures as "$\{\alpha\}_b$".

Additionally, in accordance with the present invention, the trusted intermediary S and the communication partners A, B exchange challenges to one another in the communication flows to initiate the authentication operation. As is conventional, the challenges may be formed from, or based upon: (1) time-stamp information, derived from internal clocks in the possession or control of the communication entities, which are synchronized, or (2) data or information from an authentication operation counter, which is in the possession or control of the communication entities, or (3) a nonce, which is typically a random bit stream which is generated by a random number generator which is in the possession or control of the communication entities. The utilization of a challenge satisfies two security goals. The first goal is authentication. The second goal is the prevention of interleaving attacks by an active adversary in an effort to obtain, through deceit, a session key. The authentication goal is accomplished by the generation of the challenge by one partner, and the communication of that challenge, in plaintext, to the second party (or authentication server). The challenge is received, and manipulated in a manner which is keyed by the long-lived secret key which is in the possession of the receiving party. The encrypted or masked challenge is then directed back to the partner which generated the challenge. The partner which generated the challenge can then utilize the long-lived and shared secret key to either (1) decrypt or unmask the masked challenge, or (2) mask the challenge which it generated, in order to compare it to the masked challenge which has been received, either way in order to authenticate the identity of the other communication partner.

In the figures of this description, the challenges between the communication entities are identified as "CHALLENGE$_{xy}$", wherein "x" and "y" are utilized to identify the parties involved in the challenge, with "x" identifying the party originating the challenge, and "y" identifying the party which receives the challenge. Therefore, in the context of the embodiments described herein, the letters "S, A, B" are utilized to identify the challenging party and the challenged party.

In accordance with the present invention, the communication entities (authentication server S, and communication partners A, B) exchange authentication proofs with one another to provide proof of authenticity which is not subject to conventional interleaving attacks, such as an oracle session attack, a parallel session attack, offset attacks, and replay attacks, all of which are identified and discussed in the following article, which is incorporated herein fully as if set forth: R. Bird, I. Gopal, A. Herzberg, P. Janson, S. Kutten, R., Molva and M. Yung, "Systematic design of a family of attack-resistant authentication protocols", to be published in the IEEE Journal on Selected Areas in Communication, (1993); earlier version in *Advances in Cryptology—Proceedings of CRYPTO* 91, Springer-Verlag:, 1991. In accordance with the present invention, the authentication "proofs" which are exchanged are identified by the letter "$\pi_{xy}$", wherein "x" identifies the communication entity which is offering the proof of authenticity and "y" identifies the communication entity which is receiving the proof of authenticity. In the context of the present invention, the letters "S, A, B" are utilized to identify the entity offering proof of authenticity and the entity receiving the proof of authenticity.

In the preferred embodiments of the present invention, the authenticity proofs $\pi_{XY}$ are message authentication codes (MAC) which are derived utilizing conventional message authentication operations, which are discussed in greater detail herebelow, and which are keyed by a particular secret key, which in the context of these discussed embodiments are the long-lived secret and shared keys a, b, or the short-lived session key $\alpha$.

Next, each of the particular four embodiments will be discussed detail, followed by a general discussion of the particular message authentication code (MAC) operations which are suitable for use with the present invention.

THE FIRST EMBODIMENT

The first embodiment of the present invention is depicted graphically in FIGS. 1, 2, and 3. FIG. 1 depicts the exchange of communication flows between trusted intermediary S and communication partners A, B. Trusted intermediary S shares long-lived secret keys a, b with communication partners A, B. These figures depict a four-pass (that is, four communication flows), three-party authentication with concomitant short-lived secret key exchange. The three parties involved are communication partner A, communication partner B and trusted intermediary S. Communication partner A and trusted intermediary S share a secret key a, and communication partner B and trusted intermediary S share a secret key b. If both communication partners A and B accept, then they will share a short-lived secret session key $\alpha$, which is selected and provided by trusted intermediary S. The timeliness and freshness of these communication flows is guaranteed by using a time-variant parameter as a component of the challenges which are exchanged between these communication entities. The time variant parameters may include time stamps, sequence numbers, or random numbers, as is conventional. Because there are only four communication flows, communication partner B does not have an opportunity to hear the answer to any question it might pose to either trusted intermediary S or communication partner A. Because of this, freshness, as far as communication partner B is concerned, can only be guaranteed using time stamps or sequence numbers.

In communication flow 1, communication partner A sends to trusted intermediary S an initial request CHALLENGE$_{AS}$ to engage in a mutual authentication and short-lived session key exchange with communication partner B. Trusted intermediary S responds to the request by selecting a short-lived and secret session key $\alpha$ to issue to both communication partner A and communication partner B. S encrypts the short-lived and secret session key utilizing the long-lived and secret keys a, b. Trusted intermediary S also generates authentication proof $\pi_{SB}$ for the benefit of communication partner B to demonstrate that communication flow 2 was in fact generated by trusted intermediary S. The authentication proof $\pi_{SB}$ which is generated by trusted intermediary S is solely for the benefit of communication partner B, and requires for its generation and verification the possession or knowledge of long-lived and shared secret b. In addition, trusted intermediary S sends to communication partner A an authentication proof $\pi_{SA}$ for the benefit of communication partner A. This proof $\pi_{SA}$ requires for its generation and verification the possession or knowledge of long-lived and shared secret a. This proof should satisfy communication partner A of the authenticity of trusted intermediary S.

In communication flow 2, trusted intermediary S directs to communication partner A the following items: (1) the short-lived and secret session key $\alpha$ encrypted utilizing the long-lived and shared secret key a which can only be read by communication partner A, (2) the short-lived and secret session key $\alpha$ encrypted utilizing the long-lived and shared secret key b, which can only be read by communication partner B, (3) authentication proof $\pi_{SB}$, which should satisfy communication partner B that the short-lived and secret session key $\alpha$ was provided by the trusted intermediary S, and (4) authentication proof $\pi_{SA}$ which proves to communication partner A that the contents of communication flow 2 indeed originated from trusted intermediary S, and, optionally (5) textual matter Text2 which is not required for either the authentication operation or session key distribution operation.

In communication flow 3, communication partner A passes along to communication partner B the encrypted short-lived secret session key $\{\alpha\}_b$, as well as the authentication proof $\pi_{SB}$. Communication partner B can decrypt $\{\alpha\}_b$ to derive the short-lived and secret session key $\alpha$, and can analyze the authentication proof $\pi_{SB}$ to determine that the short-lived and secret session key $\alpha$ indeed originated from the trusted intermediary S. In addition, communication partner A generates her own authentication proof $\pi_{AB}$ for the benefit of communication partner B. This authentication proof acts to convince communication partner B that communication flow 3 indeed originated from communication partner A. Authentication $\pi_{AB}$ must be derived, at least partially, from a time stamp or sequence number in order to guarantee timeliness and freshness of the message. Finally, in communication flow 3, communication partner A issues (possibly implicitly) her own authentication challenge "CHALLENGE$_{AB}$". Communication partner B will respond to CHALLENGE$_{AB}$ in a manner which convinces communication partner A that the fourth communication flow originates with communication partner B. Communication partner A may optionally include Text3 which is not utilized in either the authentication operation or the session key distribution operation.

In communication flow 4, communication partner B sends to communication partner A an authentication proof $\pi_{BA}$, which convinces communication partner A that the fourth communication flow originates with communication partner B. Preferably, this authentication proof takes the form of a message authentication code.

FIGS. 2 and 3 will now be utilized to provide greater detail regarding the data exchanged in the four communication flows of FIG. 1. FIG. 2 provides a table which correlates the abstract items identified in the four data flows of FIG. 1 with more concrete items which are necessary to account for the communication flows. In this table, the symbols "$N_A$" and "$N'_A$" are time-variant parameters. They may be omitted if timeliness is guaranteed by time stamps or sequence numbers. The values "$T_A$" and "$T_s$" are more specific: they must be time stamps or sequence numbers originating from either communication partner A or B or trusted intermediary S.

In the table, "$CHALLENGE_{AS}$" is identified as being a time-variant parameter $N_A$. Authentication proof $\pi_{SB}$ is identi as being a combination of a time stamp or sequence number $T_s$, which is generated by trusted intermediary S and a message authentication code operation, which is keyed utilizing the long-term secret key b, and performed on the following items: (1) an identification of the trusted intermediary S, an identification of communication partner A, a time stamp or sequence number which originated from trusted intermediary S, and the masked or encrypted short-lived secret session key $\alpha$, which is encrypted by the long-term and secret key b.

In accordance with the table of FIG. 2, authentication proof $\pi_{SA}$ is composed of a single component, namely the result of application of a message authentication code, keyed with a short-lived and secret session key $\alpha$, when applied to a plurality of items, including the identification of the trusted intermediary S, and identification of communication partner B, the time-variant parameter $N_A$, the short-lived session key $\alpha$ encrypted utilizing the long-lived and secret key represented as $\{\alpha\}_a$, the short-lived and secret session key $\alpha$ encrypted or masked utilizing the long-lived secret key b as a key and represented as $\{\alpha\}_b$b, Text2, and the authentication proof $\pi_{SB}$.

In accordance with the table of FIG. 2, $CHALLENGE_{AB}$ is a time-variant parameter in $N'_A$. In accordance with the table of FIG. 2, the authentication proof $\pi_{AB}$ includes two items: a time stamp or sequence number originated by communication partner A which is represented by $T_A$, and the result of the application of a method authentication code (MAC), which is keyed with the short-lived secret key $\alpha$, to a plurality of parameters including (1) an identification of communication partner A, (2) a time stamp or sequence number generated by communication partner A, which is identified as $T_A$, (3) a time-variant parameter $N'_A$, and (4) Text3.

In accordance with the table of FIG. 2, the authentication proof $\pi_{BA}$ is composed of a single item: the application of a method authentication code, which is keyed with the short-lived and secret session key $\alpha$, to a plurality of parameters including (1) an identification of communication partner B, (2) a time-variant parameter $N'_A$, and (3) Text4.

FIG. 3 provides one specific example of the utilization of the protocol described and depicted above in connection with FIGS. 1 and 2. In the protocol of FIG. 3, additional portions of the data flows between the communication entities are included in the group of variables which are subjected to a message authentication code operation. In particular, in communication flow 2, the second method authentication code operation (the one which is keyed with the short-lived secret key $\alpha$) includes additional variables which are subject to the method authentication code operation. This is to provide an ancillary benefit of having all the previous arguments in that data flow subjected to the method authentication code operation to provide a message authentication code tag which is indicative both of entity authentication and message authentication for the first portion of the communication flow 2.

THE SECOND EMBODIMENT

The second embodiment of the present invention is depicted in FIGS. 4, 5, and 6 in a presentation which is similar to that of the first embodiment. In this particular embodiment, five communication flows occur involving trusted intermediary S, and communication partners A, B. These five communication flows are depicted in simplified form in FIG. 4, with detail being provided in the table of FIG. 5, and the information of FIGS. 4 and 5 combined in FIG. 6, in a particular instantiation of the protocol.

In the first communication flow, communication partner A generates a $CHALLENGE_{AS}$ for trusted intermediary S, and a $CHALLENGE_{AB}$ for communication partner B, and passes these challenges to communication partner B along with Text1, which is plaintext which is not necessary for the performance of either the entity authentication operation or the session key distribution operation.

In the second communication flow, communication partner B passes along $CHALLENGE_{AS}$ and $CHALLENGE_{AB}$ to trusted intermediary S, along with a plaintext Text2 which is not necessary for either the performance of the entity authentication operation or the session key distribution operation.

In response to the second communication flow, trusted intermediary S generates a short-lived and secret session key $\alpha$ for utilization by communication partners A, B. The short-lived and secret session key $\alpha$ is encrypted or masked utilizing the long-lived and secret key $\alpha$ to derive $\{\alpha\}_a$. The short-lived and secret session key $\alpha$ is likewise masked or encrypted utilizing the long-lived and secret key b to derive $\{\alpha\}_b$. These encryptions of the short-lived session key $\alpha$ are transmitted in communication flow 2 along with authentication proof $\pi_{SA}$, authentication proof $\pi_{SB}$, which respectively prove the authenticity of trusted intermediary S to both communication partners A, B, and a plaintext Text3 which is not essential for the entity authentication and key distribution operations.

In the fourth communication flow, communication partner B directs the masked or encrypted short-lived and secret session key $\alpha$ which is represented by $\{\alpha\}_a$, and authentication $CHALLENGE_{BA}$, authentication proof $\pi_{SA}$, authentication proof $\pi_{BA}$, and plaintext Text4, which is not essential for the authentication or key distribution operations.

In the fifth communication flow, communication partner A directs authentication proof $\pi_{AB}$, and plaintext Text5 to communication partner B.

In this particular configuration, several communication partners have an opportunity to challenge other communication partners; these challenges are represented by: $CHALLENGE_{AS}$, $CHALLENGE_{AB}$, and $CHALLENGE_{BS}$.

Trusted intermediary S has an opportunity to generate a short-lived and secret session key α, and to encrypt that short-lived and secret session key α utilizing the long-lived and secret keys a, b.

In this particular configuration, authentication proof $\pi_{SA}$ is responsive to the CHALLENGE$_{AS}$ which is generated by communication partner A to challenge the authenticity of trusted intermediary S. The authentication proof $\pi_{SA}$ convinces communication partner A that (1) $\{\alpha\}_a$ was indeed encrypted by trusted intermediary S, and (2) this response was generated subsequent to the transmission of CHALLENGE$_{AS}$. Authentication proof $\pi_{SB}$ is responsive to the CHALLENGE$_{BS}$ which was generated by communication partner B to test the authenticity of trusted intermediary S. The receipt of authentication proof $\pi_{SB}$ convinces communication partner B that: (1) the string of data contained in communication flow 2 was received by trusted intermediary S, and (2) the string of communication flow 3 was subsequently generated by trusted intermediary S. Authentication proof $\pi_{BA}$ is responsive to CHALLENGE$_{AB}$. This authentication proof $\pi_{BA}$ convinces communication partner A that (1) the data contained in communication flow 1 was received by communication partner B, and (2) the string of communication flow 4 was generated by communication partner B. Authentication proof $\pi_{AB}$ is responsive to CHALLENGE$_{BA}$. This authentication proof $\pi_{AB}$ convinces communication partner B that the data of communication flow 5 was indeed generated by communication partner A.

FIG. 5 provides in tabular form an identification of the content of the particular authentication proofs and challenges which are identified in high level form in FIG. 4. This represents one concrete instantiation of the abstract protocol of FIG. 4, and other possible instantiations exist. In this table, "$R_A$, $R_B$, and $R'_B$" are random challenges, such as those generated by random number generators.

As is shown in this table, the authentication proof $\pi_{SA}$ is composed of the result of applying a method authentication code, keyed with a long-lived and secret key α, to a plurality of variables including (1) the identification of trusted intermediary S, (2) the identification of communication partner B, (3) the random CHALLENGE $R_A$, and (4) the masked or encrypted short-lived session key $\{\alpha\}_a$.

Authentication proof $\pi_{SB}$ is generated by the application of a method of authentication code, keyed with a long-lived and secret key b, to a plurality of variables including (1) the identification of the trusted intermediary S, (2) an identification of communication partner A, (3) random CHALLENGE $R_A$, (4) random CHALLENGE $R_B$, and (5) optional text string Text2, (6) the masked or encrypted short-lived and secret session key α encrypted separately under the long-lived and secret key α and the long-lived and secret key b, (7) optional text string Text3, and (8) the authentication proof $\pi_{SA}$.

Authentication proof $\pi_{BA}$ is generated by the application of a message authentication code, keyed with the short-lived and secret session key α, to a plurality of variables including (1) an identification of communication partner B, (2) the random CHALLENGE $R'_B$, and (3) optional text strings such as Text1 and Text4.

Authentication proof $\pi_{AB}$ is generated by the application of a message authentication code, keyed with a short-lived and secret session key α, to a plurality of variables including (1) an identification of communication partner A, (2) random CHALLENGE $R'_B$, and (3) an optional text string Text5.

As with the previous embodiment, FIG. 6 represents a combination of the information of the high-level of FIG. 4, and the detail of the table of FIG. 5, but is just one example of a utilization of such a protocol and includes items in the message authentication code operation which are not necessary for the authentication operation.

THE THIRD EMBODIMENT

FIGS. 7, 8, and 9 depict a third embodiment of the present invention, which comprises a five-pass, three-party authentication with an ABASAB-format. This is a mutual authentication mechanism with concomitant secret key exchange. As before, communication partner A and trusted intermediary S share a secret key α, while communication partner B and trusted intermediary S share a secret key b. If both communication partners A, B accept, then they will share a session key α issued by trusted intermediary S. Timeliness and freshness is guaranteed (in the preferred embodiment) by using random numbers.

In the first communication flow, communication partner A issues CHALLENGE$_{AB}$ to communication partner B. Optionally, a non-essential text string Text1 may be provided.

In communication flow 2, communication partner B issues an authentication challenge to trusted intermediary S in the form of CHALLENGE$_{BS}$ through communication partner A. Additionally, communication partner B issues an authentication challenge to communication partner A in the form of CHALLENGE$_{BA}$. Additionally, communication partner B responds to the authentication challenge issued by communication partner A by providing authentication proof $\pi_{BA}$. Optionally, non-essential text may be provided in the form of Text2.

In communication flow 3, communication partner A relays the authentication challenge CHALLENGE$_{BS}$ to trusted intermediary S, and issues its own challenge in the form of CHALLENGE$_{AB}$ to trusted intermediary S. Additionally, communication partner A transmits authentication proof $\pi_{BA}$ to trusted intermediary S. Optionally, non-essential plaintext may be provided in the form of Text1 and Text4.

Trusted intermediary S responds to communication partner A by generating a short-lived and secret session key α, and then masking or encrypting the short-lived and secret session key α under both of long-lived and secret keys a, b. This information is transmitted to communication partner A in the fourth communication flow in the form of $\{\alpha\}_a$ and $\{\alpha\}_b$. Additionally, in the fourth communication flow, trusted intermediary S directs authentication proofs $\pi_{SB}$, and $\pi_{SA}$ to communication partner A. Optionally, non-essential plaintext Text4 may be included in the fourth communication flow.

In the fifth, and final, communication flow, communication partner A distributes the masked or encrypted short-term and secret session key $\{\alpha\}_b$, and the trusted intermediary's authentication proof $\pi_{SB}$ to communication partner B. Communication partner A also proves it authenticity to communication partner B by transmitting authentication proof $\pi_{AB}$. Optionally, non-essential plaintext may be provided in the form of Text5.

In this protocol, CHALLENGE$_{AB}$ is a challenge generated by communication partner A to test the authenticity of communication partner B. Communication partner B responds to this challenge by providing authentication proof $\pi_{BA}$. This proof convinces communication partner A that (1) the string sent by communication partner B in communication flow 1 was received by communication partner B, and (2) the string received by communication partner A was subsequently sent by communication partner B. However, A is unable to verify the validity of this proof immediately on its receipt in communication flow 2. However, trusted intermediary S is able to determine the validity of this authentication proof, so trusted intermediary S subsequently checks authentication proof $\pi_{BA}$ on the behalf of communication partner A, or else trusted intermediary S provides communication partner A with adequate information so as to be able to verify the proof herself at a later time. In either case, following the receipt of communication flow 4 from trusted intermediary S, communication partner A can verify the validity of authentication proof $\pi_{BA}$.

In this protocol, authentication proof $\pi_{SB}$ is responsive to CHALLENGE$_{BS}$, which was issued by communication partner B to test the authenticity of trusted intermediary S. This authentication proof $\pi_{SB}$ convinces communication partner B that (1) the challenge generated by communication partner B was received by trusted intermediary S, and (2) trusted intermediary S subsequently encrypted the short-lived and secret session key α.

In the protocol of FIG. 7, authentication proof $\pi_{SA}$ is responsive to CHALLENGE$_{AS}$, which was generated by communication partner A to test the authenticity of trusted intermediary S. This proof convinces communication partner A that (1) the string sent to trusted intermediary S in communication flow 3 was received by communication partner S, and (2) the string received by communication partner A in communication flow 4 was subsequently generated by trusted intermediary S.

Also, in the embodiment of FIG. 7, authentication $\pi_{AB}$ is responsive to CHALLENGE$_{AB}$ which was generated by communication partner A to test the authenticity of communication partner B. This proof convinces communication partner B that the string received in communication flow 5 was indeed generated by communication partner A, and subsequent to the transmission of communication flow 2.

As with the previous embodiments, FIG. 8 provides greater detail regarding the communication flows of FIG. 7, and the information contained in FIGS. 7 and 8 are combined to provide the graphical depiction of the communication flows of one example in FIG. 9. In accordance with this table, R$_A$ and R$_B$ are random challenges.

In accordance with the table of FIG. 8, authentication proof $\pi_{BA}$ is derived by the application of a message authentication code, which is keyed with the long-lived and secret key b, to a plurality of values including an (1) identification of communication partner B, (2) random CHALLENGE R$_A$, (3) random CHALLENGE R$_B$, and (4) a non-essential plaintext in the form of Text1.

Authentication proof $\pi_{SB}$ is generated by the application of a message authentication code, which is keyed with the long-lived and secret key b, to a plurality of values including (1) an identification of trusted intermediary S, (2) an identification of communication partner A, (3) random CHALLENGE R$_B$, and (4) the short-lived and secret session key α, which is keyed with the long-lived and secret key b as represented by $\{a\}_b$.

Authentication proof $\pi_{SA}$ is generated by the application of a message authentication code, which is keyed with a long-lived key α, to a plurality of variables including (1) the identification of trusted intermediary S, (2) an identification of communication party B, (3) random CHALLENGE R$_A$ (4) random CHALLENGE R$_B$, (5) non-essential plaintext in the form of Text1, Text3, and Text4, (6) authentication proof $\pi_{SB}$, and (7) the short-lived and secret session key α which is keyed both under the long-lived and secret key α and the long-lived and secret key b and represented in the form of $\{\alpha\}_a$ and $\{\alpha\}_b$.

Authentication proof $\pi_{AB}$ is generated by the application of a message authentication code, which is keyed with the short-lived and secret session key α, to a plurality of variables including (1) an identification of communication partner A, (2) random CHALLENGE R$_B$, and (3)non-essential plaintext in the form of Text2, Text5.

As stated above, the information contained in FIG. 7 and FIG. 8 may be combined, with additional non-essential information, to form the communication flows depicted in FIG. 9.

THE FOURTH EMBODIMENT

The fourth embodiment of the present invention is depicted in FIGS. 10, 11, and 12, and represents a five-pass, three-party authentication with an ASABAB-format. FIG. 10 represents a high-level representation of the communication flows between communication partners A, B, and trusted intermediary S. FIG. 11 provides in tabular form, greater information regarding the components of the communication flows of this particular embodiment, while FIG. 12 provides a view of a combination of the information provided in FIGS. 10 and 11 in one particular example.

With reference first to FIG. 10, in the first communication flow, communication partner A directs an authentication challenge CHALLENGE$_{AS}$ to trusted intermediary S, and optionally provides a non-essential plaintext component in the form of Text1. Upon receipt of the challenge, trusted intermediary S generates a short-lived and secret session key α, and then encrypts or masks the short-lived and secret session key α under both the long-lived and secret key α and the long-lived and secret key b. Trusted intermediary S directs these encrypted short-lived and secret session keys to communication partner A, along with authentication proof $\pi_{SB}$ and authentication proof $\pi_{SA}$. Optionally, a non-essential plaintext portion may be provided in the form of Text2.

Communication partner A then passes the encrypted or masked short-lived and secret session key α represented in the form of $\{\alpha\}_b$, to communication partner B in communication flow 3, along with authentication proof $\pi_{SB}$, and authentication challenge CHALLENGE$_{AB}$. Optionally, a non-essential plaintext portion may be provided in the form of Text3.

In communication flow 4, communication partner B responds to the challenge of communication partner A with authentication proof $\pi_{BA}$, but also challenges the authenticity of communication partner A in the form of CHALLENGE$_{AB}$. Optionally, a non-essential plaintext portion may be provided in the form of Text4.

In the fifth, and final, communication flow of this protocol, communication partner A responds to the authentication challenge of communication partner B by providing an authentication proof $\pi_{AB}$ to communication partner B. Optionally, a non-essential plaintext portion may be provided in the form of Text5.

In this particular embodiment, timeliness and freshness is guaranteed through the use of random numbers. Therefore, in the table of FIG. 11, challenges CHALLENGE$_{AS}$, CHALLENGE$_{AB}$, and CHALLENGE$_{BA}$ represent random number type challenges represented as R$_A$, R'$_A$, and R$_B$. In this particular embodiment, authentication proof $\pi_{SB}$ is generated by the application of a message authentication code, which is keyed with the long-lived and secret key b, to a plurality of variables including (1) an identification of trusted intermediary S, (2) an identification of communication partner A, and (3) the encrypted or masked short-lived and secret key α as represented by $\{\alpha\}_b$.

Authentication proof $\pi_{SA}$ is generated by the application of a message authentication code, which is keyed with the short-lived and secret session key α, to a plurality of variables including (1) an identification of the trusted intermediary S, (2) an identification of communication partner B, (3) random challenge $R_A$, (4) non-essential and optional Text1, (5) the encrypted session key $\{\alpha\}_a$, (6) the encrypted session key $\{\alpha\}_b$, (7) authentication proof $\pi_{SB}$, and (8) non-essential and optional plaintext Text2.

Authentication proof $\pi_{BA}$ is generated by the application of a message authentication code, which is keyed with the short-lived and secret session key α, to a plurality of variables including (1) an identification of communication partner B, (2) random CHALLENGE $R'_A$, (3) random CHALLENGE $R_B$, and (4) non-essential optional plaintext portions represented as Text3 and Text4.

Authentication proof $\pi_{AB}$ is generated by the application of a message authentication code, which is keyed with the short-lived and secret session key α, to a plurality of variables including an (1) identification of communication partner A, (2) random CHALLENGE $R_B$, and (3)non-essential and optional plaintext in the form of Text5.

In this particular embodiment, authentication proof $\pi_{SB}$ is generated by trusted intermediary S in response to a challenge by communication partner B. This proof convinces communication partner B that the short-lived and secret session key αwas indeed generated by the trusted intermediary S. Authentication proof $\pi_{SA}$ is responsive to the authentication challenge CHALLENGE$_{AB}$ of communication partner A. This proof convinces communication partner A that (1) the string which was sent in communication flow 1 was indeed received by trusted intermediary S, and (2) the strings received from communication flow 2 were subsequently sent by trusted intermediary S. Authentication proof $\pi_{BA}$ is responsive to authentication challenge CHALLENGE$_{AB}$ generated by communication partner A. This proof convinces communication partner A that (1) the message sent by communication partner A in communication flow 3 was received by communication partner B, and (2) the message received by communication partner A in communication flow 4 was subsequently sent by communication partner B. Authentication proof $\pi_{AB}$ is responsive to the authentication challenge CHALLENGE$_{BA}$ which was generated by communication partner B. This proof convinces communication partner B that (1) the message sent by communication partner B at communication flow 4 was received by communication partner A, and (2) the message received by communication partner B in communication flow 5 was subsequently sent by communication partner A.

A combination of the information contained in FIGS. 10 and 11 provides the detailed instantiation of the abstract protocol in FIG. 12.

MESSAGE AUTHENTICATION CODE OPERATIONS

Message authentication codes (MACs) are utilized in cryptography to assure the authenticity of communications. These types of operations are frequently referred to as "message authentication operations". Typically, message authentication operations permit a receiver to validate a message's origin and destination, contents, timeliness, and sequence relative to other messages flowing between communicants.

While a variety of algorithms may serve to perform the method authentication code (MAC) operations, the best known and official scheme is documented in the DES MODES OF OPERATION publication, more specifically identified as the Federal Information Processing Standards Publication, FIPS PUB 81, published by the National Bureau of Standards on Dec. 2, 1980. Preferably, the Cipher Block Chaining (CBC) mode is used to encrypt plaintext, which must be padded (for example, with zero bits) if necessary to make it a multiple of sixty-four bits in length. The MAC consists of the last k bits of cyphertext, the rest of which is discarded. This process is discussed in an article by C. H. Meyer and S. M. Matyas, entitled "Cryptography: A New Dimension in Computer Data Security", published by John Wiley & Sons, of New York, in 1982. The utilization of the DES algorithm in the Cipher Block Chaining mode of operation demonstrates a well-established forward error propagating property; therefore, the change of even so much as a single bit in the plaintext would cause an unpredictable change in every bit in the MAC with the probability of fifty percent for each bit. Utilizing a MAC which is k-bits long, and the MAC is transmitted along with the associated message to be authenticated, and that portion is recomputed on the received message at the destination, then there is only a probability of $2^{-k}$ that the received MAC matches the recomputed MAC in the event that the transmitted message has been tampered with. This probability can be made as small as desired by choosing k sufficiently large.

In the preferred embodiment of the present invention, the Cipher Block Chaining operation is utilized to generate the message authentication code (MAC). The DES operation which is utilized in the Cipher Block Chaining is keyed with a particular secret key. In the embodiments discussed herein, the keys are either the short-lived secret session key α, the long-lived secret key α, or the long-lived secret key b. The keying of the message authentication code (MAC) operation with a secret key ensures that the authentication tag produced as a result of the message authentication code operation serves to authenticate the one or more communication parties.

An article published in the September 1985 issue of IEEE Communications Magazine, Volume 23, No. 9, entitled "Message Authentication" by R. R. Jueneman, S. M. Matyas, and C. H. Meyer sets forth alternatives to the Cipher Block Chaining operation, and is incorporated herein fully as if set forth.

APPLICATIONS OF THE AUTHENTICATION PROTOCOLS

Figure 13:
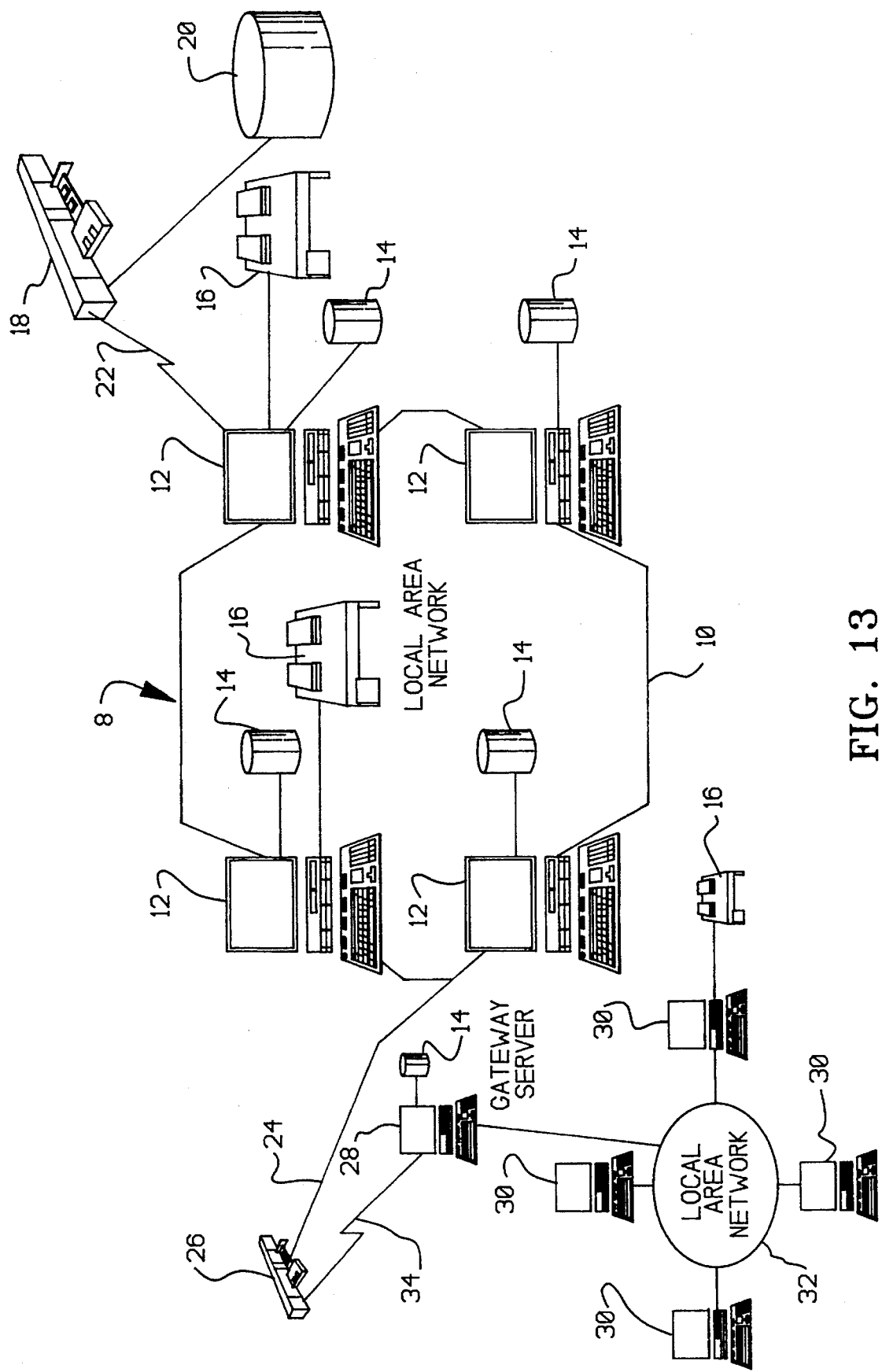
FIG. 13 is a depiction of a distributed data processing system which can utilize the techniques of the present invention to secure communications.

The protocols of the present invention may be utilized in a distributed data processing system to authenticate one or more communication partners in the distributed data processing system. In such an environment, one or more data processing units perform the functions of the trusted intermediary S. FIG. 13 depicts a distributed data processing system 8 which may be programmed to perform the protocols described herein.

As is shown in FIG. 13, distributed data processing system 8 may include a plurality of networks, such as local area networks (LAN) 10 and 32, each of which preferably includes a plurality of individual computers 12, 30, respectively. Of course, those skilled in the art will appreciate that a plurality of intelligent work stations coupled to a host computer may be utilized for each such network. As is common in such distributed data processing systems, each individual computer may be coupled to a storage device 14 and/or a printer/output device 16. One or more such storage devices 14 may be utilized, in accordance with the method and system of the present invention, to store various "groupware" applications or documents which may be simultaneously or successively accessed and processed by multiple users. Furthermore, one or more systems may be included for managing data processing resources, including the groupware applications and documents, in accordance with conventional technologies..

Still referring to FIG. 13, it may be seen that distributed data processing network 8 may also include multiple mainframe computers, such as mainframe computer 18, which may be preferably coupled to local area network (LAN) 10 by means of communications link 22. Mainframe computer 18 may be coupled to a storage device 20 which may serve as remote storage for local area network (LAN) 10 and may be coupled via communications controller 26 and communications link 34 to a gateway server 28. Gateway server 28 is preferably an individual computer or intelligent work station (IWS) which serves to link local area network (LAN) 32 to local area network (LAN) 10.

As discussed above with respect to local area network (LAN) 32 and local area network (LAN) 10, a plurality of data objects, application programs, and data files, groupware programs, or groupware documents may be stored within storage device 20 and controlled by mainframe computer 18, as resource manager or library service for the data objects and documents thus stored. Those skilled in the art will appreciate that it is often desirable to permit simultaneous or successive, as well as restricted, access to such data objects, application programs, data files, groupware applications, or groupware documents to allow for the beneficial synergistic effects of group work. Additionally, those skilled in the art will appreciate that mainframe computer 18 may be located a great geographical distance from local area network (LAN) 10; and, similarly, local area network (LAN) 10 may be located a substantial distance from local area network (LAN) 32. That is, local area network (LAN) 32 may be located in California, while local area network (LAN) 10 may be located in Texas, and mainframe computer 18 may be located in New York.

While the invention has been particularly shown and described with reference to a preferred embodiment, it will be understood by those skilled in the art that various changes in form and detail may be made therein without departing from the spirit and scope of the invention.

We claim:

1. A method of authenticating communication partners utilizing communication flows which are passed over an insecure communication channel, comprising the method steps of:

(a) providing a trusted intermediary which is capable of communication with said communication partners over said insecure communication channel;

(b) providing a plurality of long-lived secret keys, one for each communication partner;

(c) distributing each of said plurality of long-lived secret keys to (1) a particular one of said communication partners, and (2) said trusted intermediary;

(d) receiving at said trusted intermediary a request for communication between communication partners;

(e) utilizing said trusted intermediary to generate a short-lived secret key for utilization in a communication session between said communication partners;

(f) masking said short-lived secret key for each particular communication partner in a manner that is dependent upon that particular partner's long-lived secret key;

(g) distributing said masked short-lived secret keys in a plurality of communication flows to said communication partners;

(h) exchanging authentication tags among said communication partners and said trusted intermediary.

2. A method of authenticating communication partners according to claim 1, wherein said step of distributing said masked short-lived secret keys occurs substantially concurrently with said step of exchanging authentication tags among said communication partners and said trusted intermediary.

3. A method of authenticating communication partners according to claim 1, wherein selected substeps of said steps of (1) distributing said plurality of masked short-lived secret keys, and (2) exchanging authentication tags among said communication partners and said trusted intermediary, occur in selected combinations in particular communication flows.

4. A method of authenticating communication partners according to claim 1, wherein at least portions of said steps of (1) distributing said masked short-lived secret keys in a plurality of communication flows to said communication partners, and (2) exchanging authentication tags among said communication partners and said trusted intermediary, occur substantially concurrently, thus minimizing in number said communication flows.

5. A method of authenticating communication partners according to claim 1, wherein said step of masking said short-lived secret key comprises:

encrypting said short-lived secret key in a plurality of encryption operations, one for each particular communication partner, which is keyed with that particular communication partner's long-lived secret key.

6. A method of authenticating communication partners according to claim 1, wherein said authentication tags comprise at least one of: (1) a message authentication code keyed by a particular one of said plurality of long-lived secret key for a particular communication partner, taken over a message being transmitted by said particular communication partner and data which identifies said particular communication partner responsible for said message, and (2) a message authentication code keyed by a particular one of said plurality of said long-lived secret keys taken over a message being transmitted by a particular communication partner and a bit string which uniquely determines identity of said particular communication partner originating said message.

7. A method of authenticating communication partners according to claim 1, wherein said authentication tags are generated by at least one message authentication operation.

8. A method of authenticating communication partners in a distributed data processing system utilizing communication flows which are passed over an insecure communication channel between data processing nodes utilized by said communication partners, comprising the method steps of:

(a) providing an authentication server which operates as a trusted intermediary which is capable of communication with said communication partners over said insecure communication channel;

(b) providing a plurality of long-lived secret keys, one for each communication partner;

(c) distributing, and recording in memory, each of said plurality of long-lived secret keys to (1) a particular one of said communication partners at a particular one of said data processing nodes, and (2) said authentication server;

(d) receiving at said authentication server a request for communication between communication partners;

(e) utilizing said authentication server to generate a short-lived secret key for utilization in a communication session between said communication partners;

(f) masking said short-lived secret key, at said authentication server, in a plurality of masking for each particular communication partner in a manner that is dependent upon that particular partner's long-lived secret key;

(g) distributing said masked short-lived secret keys in a plurality of communication flows to said communication partners;

(h) exchanging authentication tags among said communication partners and said authentication server.

9. A method of authenticating communication partners according to claim 8, wherein said step of distributing said masked short-lived secret keys occurs substantially concurrently with said step of exchanging authentication tags among said communication partners and said authentication server.

10. A method of authenticating communication partners according to claim 8, wherein selected substeps of said steps of (1) distributing said plurality of masked short-lived secret keys, and (2) exchanging authentication tags among said communication partners and said authentication server, occur in selected combinations in particular communication flows.

11. A method of authenticating communication partners according to claim 8, wherein at least portions of said steps of (1) distributing said masked short-lived secret keys in a plurality of communication flows to said communication partners, and (2) exchanging authentication tags among said communication partners and said authentication server, occur substantially concurrently, thus minimizing in number said communication flows.

12. A method of authenticating communication partners according to claim 8, wherein said step of masking said short-lived secret key comprises:

encrypting said short-lived secret key in a plurality of encryption operations, one for each particular communication partner, which is keyed with that particular communication partner's long-lived secret key.

13. A method of authenticating communication partners according to claim 8, wherein said authentication tags comprise at least one of: (1) a message authentication code keyed by a particular one of said plurality of long-lived secret key for a particular communication partner, taken over a message being transmitted by said particular communication partner and data which identifies said particular communication partner responsible for said message, and (2) a message authentication code keyed by a particular one of said plurality of said long-lived secret keys taken over a message being transmitted by a particular communication partner and a bit string which uniquely determines identity of said particular communication partner originating said message.

14. A method of authenticating communication partners according to claim 8, wherein said authentication tags are generated by at least one message authentication operation.

15. Means for authenticating communication partners utilizing communication flows which are passed over an insecure communication channel, comprising the method steps of:

(a) a trusted intermediary which is capable of communication with said communication partners over said insecure communication channel;

(b) a plurality of long-lived secret keys, one for each communication partner;

(c) wherein said plurality of long-lived secret keys are distributed to (1) a particular one of said communication partners, and (2) said trusted intermediary;

(d) means receiving at said trusted intermediary a request for communication between communication partners;

(e) means for utilizing said trusted intermediary to generate a short-lived secret key for utilization in a communication session between said communication partners;

(f) means for masking said short-lived secret key for each particular communication partner in a manner that is dependent upon that particular partner's long-lived secret key;

(g) means for distributing said masked short-lived secret keys in a plurality of communication flows to said communication partners;

(h) means for exchanging authentication tags among said communication partners and said trusted intermediary.

* * * * *

UNITED STATES PATENT AND TRADEMARK OFFICE
CERTIFICATE OF CORRECTION

PATENT NO. : 5,491,750
DATED : February 13, 1996
INVENTOR(S) : Bellare et al.

It is certified that error appears in the above-indentified patent and that said Letters Patent is hereby corrected as shown below:

Column 9, line 26: change "identi" to --identified--

Column 9, line 46: change "$\{a\}_b b$" to --$\{a\}_b$--

Column 10, line 45: change "secret key $a$" to --secret key a--

Column 11, line 37: change "secret key $a$" to --secret key a--

Column 11, line 50: change "secret key $a$" to --secret key a--

Column 12, line 13: change "secret key $a$" to --secret key a--

Column 13, line 59: change "$\{a\}_b$" to --$\{a\}_b$--

Column 13, line 62: change "long-lived key $a$" to --long-lived key a--

Column 14, line 1: change "secret key $a$" to --secret key a--

Column 14, line 42: insert a space between "$a$" and "represented"

UNITED STATES PATENT AND TRADEMARK OFFICE
CERTIFICATE OF CORRECTION

PATENT NO. : 5,491,750
DATED : February 13, 1996
INVENTOR(S) : Bellare, et al

It is certified that error appears in the above-indentified patent and that said Letters Patent is hereby corrected as shown below:

Column 16, line 38: change "secret key $a$" to --secret key a--

Signed and Sealed this

Twentieth Day of August, 1996

BRUCE LEHMAN

Attest:

Attesting Officer

Commissioner of Patents and Trademarks